(12) United States Patent
Klemenz et al.

(10) Patent No.: US 10,255,049 B2
(45) Date of Patent: Apr. 9, 2019

(54) NON-BLOCKING APPLICATION OBJECT FRAMEWORK AND DEPENDENCY MODEL MANAGEMENT

(71) Applicant: SAP SE, Walldorf (DE)

(72) Inventors: Oliver Klemenz, Sinsheim (DE); Ulrich Bestfleisch, Schwetzingen (DE); Sebastian Schroetel, Heidelberg (DE); Veit Spaegele, Wiesloch (DE); Sergey Smirnov, Heidelberg (DE)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 15/595,050

(22) Filed: May 15, 2017

(65) Prior Publication Data

US 2018/0329697 A1 Nov. 15, 2018

(51) Int. Cl.

| G06F 9/44 | (2018.01) |
|---|---|
| G06F 8/41 | (2018.01) |
| G06F 9/54 | (2006.01) |
| G06F 9/46 | (2006.01) |
| G06F 12/0806 | (2016.01) |
| G06F 9/52 | (2006.01) |
| G06F 8/60 | (2018.01) |

(52) U.S. Cl.
CPC .............. *G06F 8/456* (2013.01); *G06F 9/466* (2013.01); *G06F 9/545* (2013.01); *G06F 12/0806* (2013.01); *G06F 8/60* (2013.01); *G06F 9/52* (2013.01)

(58) Field of Classification Search
None
See application file for complete search history.

(56) References Cited

U.S. PATENT DOCUMENTS

| 7,797,329 | B2 * | 9/2010 | Lujan Moreno | ........ G06F 9/528 707/705 |
|---|---|---|---|---|
| 8,521,838 | B2 | 8/2013 | Bestfleisch et al. | |
| 8,656,347 | B2 * | 2/2014 | Ito | .......................... G06F 8/456 717/106 |
| 8,666,968 | B2 | 3/2014 | Sachs et al. | |
| 8,732,668 | B2 | 5/2014 | Klemenz et al. | |
| 8,880,561 | B2 | 11/2014 | Klemenz et al. | |

(Continued)

*Primary Examiner* — Insun Kang
(74) *Attorney, Agent, or Firm* — Fish & Richardson P.C.

(57) ABSTRACT

Techniques are described for providing a non-blocking application object framework allowing parallelization of operation and function calls throughout an application executing within the framework. In one example, a dependency model associated with an application in a non-blocking application object framework is identified, where the application is associated with a plurality of operations and the dependency model defines at least one dependency between at least two of the operations. At runtime of the non-blocking application object framework, the identified dependency model is interpreted. An optimized execution plan of the application is automatically generated in the non-blocking application object framework based on the interpreted dependency model, wherein at least a first portion of the operations of the application are optimized in a sequential execution order based on dependencies defined in the dependency model. The application is then executed in the non-blocking application object framework based on the optimized execution plan.

16 Claims, 6 Drawing Sheets

(56) References Cited

U.S. PATENT DOCUMENTS

| | | |
|---|---|---|
| 8,892,545 B2 | 11/2014 | Kazmaier et al. |
| 8,997,070 B2 | 3/2015 | Klemenz et al. |
| 9,031,900 B2 | 5/2015 | Albrecht et al. |
| 9,043,315 B2 | 5/2015 | Gruschko et al. |
| 9,069,373 B2 | 6/2015 | Sachs et al. |
| 9,070,107 B2 | 6/2015 | Klemenz |
| 9,075,597 B2 | 7/2015 | Klemenz |
| 9,195,690 B2 | 11/2015 | Wilking et al. |
| 9,348,874 B2 | 5/2016 | Schroetel et al. |
| 9,367,199 B2 | 6/2016 | Klemenz et al. |
| 9,378,264 B2 | 6/2016 | Schroetel et al. |
| 9,400,830 B2 | 7/2016 | Dipper et al. |
| 9,530,115 B2 | 12/2016 | Klemenz |
| 9,600,299 B2 | 3/2017 | Klemenz et al. |
| 2004/0049509 A1* | 3/2004 | Keller .................. G06F 11/008 |
| 2005/0193381 A1* | 9/2005 | Hellerstein ............ G06Q 10/04 717/144 |
| 2006/0229888 A1* | 10/2006 | Colle .................... G06Q 10/00 717/108 |
| 2007/0168932 A1* | 7/2007 | Seeger .................... G06F 8/10 717/105 |
| 2008/0040364 A1* | 2/2008 | Li .......................... G06Q 10/10 |
| 2010/0082646 A1* | 4/2010 | Meek .................. G06F 17/3056 707/752 |
| 2010/0191716 A1* | 7/2010 | Chen ................ G06F 17/30445 707/713 |
| 2011/0295791 A1* | 12/2011 | Venkatasubramanian .................... G06F 17/30563 707/600 |
| 2011/0295795 A1* | 12/2011 | Venkatasubramanian .................... G06F 17/30563 707/602 |
| 2012/0233593 A1* | 9/2012 | Sahoo ....................... G06F 8/61 717/120 |
| 2013/0145348 A1* | 6/2013 | Agovic ............... G06F 17/3056 717/120 |
| 2013/0185250 A1 | 7/2013 | Albrecht et al. |
| 2013/0305224 A1* | 11/2013 | Eade ........................ G06F 8/20 717/126 |
| 2013/0339082 A1 | 12/2013 | Kazmaier et al. |
| 2014/0164963 A1 | 6/2014 | Klemenz et al. |
| 2014/0236781 A1 | 8/2014 | Bestfleisch et al. |
| 2014/0372368 A1 | 12/2014 | Schroetel et al. |
| 2014/0379754 A1 | 12/2014 | Dipper et al. |
| 2016/0378285 A1 | 12/2016 | Graf et al. |
| 2016/0378450 A1* | 12/2016 | Fu ............................ G06F 8/61 717/177 |

* cited by examiner

Example Nested Array of Determination Definition: 

[fnDeterminationA, [fnDetermination1, fnDetermination2, [fnDeterminationX, fnDeterminationY]], fnDeterminationB]

Alternative Nested Array:

```
[
fnDeterminationA,
    [
        fnDetermination1, fnDetermination2,
        [
            fnDeterminationX, fnDeterminationY
        ]
    ],
fnDeterminationB
]
```

Determination Execution Order:
1. fnDeterminationX, fnDeterminationY → called in parallel
2. fnDetermination1, fnDetermination2 → called in parallel after (1) completed
3. fnDeterminationA, fnDeterminationB → called in parallel after (1) and (2) completed

FIG. 5

NON-BLOCKING APPLICATION OBJECT FRAMEWORK AND DEPENDENCY MODEL MANAGEMENT

TECHNICAL FIELD

The present disclosure relates to techniques for providing a non-blocking application object framework allowing parallelization of operation and function calls throughout an application executing within the framework.

BACKGROUND

Modern development platforms offer an end-to-end developer experience from the underlying database to a user interface. To do so, an Application Object Framework (AOF) is provided to developers, where the AOF includes at least some of the following modules: a database layer, a metadata layer, an implementation layer, a runtime layer, an exposure layer, and a user interface layer. By providing these layers, the AOF provides a central part of the development platform allowing for an efficient development process from the user interface (UI) to the backend or underlying database.

Present AOFs only allow a blocking access to an object runtime. As a result, numerous threads may be blocked from being called or executed, therefore waiting until a previously called resource is fulfilled before continuing execution in a particular thread. The AOF access cannot be parallelized, but requires sequential execution leading to poor CPU utilization and worse performance.

SUMMARY

Implementations of the present disclosure are generally directed to providing a non-blocking application object framework allowing parallelization of operation and function calls throughout an application executing within the framework. In one example implementation, a computerized method executed by hardware processors can be performed. The example method can comprise identifying a dependency model associated with an application in a non-blocking application object framework, where the application is associated with a plurality of operations and the dependency model defines at least one dependency between at least two of the operations of the application. At runtime of the non-blocking application object framework, the identified dependency model is interpreted. An optimized execution plan of the application is automatically generated in the non-blocking application object framework based on the interpreted dependency model, where at least a first portion of the operations of the application are optimized in a sequential execution order based on dependencies defined in the dependency model. The application is then executed in the non-blocking application object framework based on the optimized execution plan.

Implementations can optionally include one or more of the following features. In some instances, the first portion of the operations of the application optimized in a sequential execution order are executed synchronously during execution of the application.

In some instances, at least a second portion of the operations of the application are optimized in a parallel execution order, where the operations of the second portion of the operations of the application are not associated with defined dependencies in the identifying dependency model. In those instances, the second portion of the operations of the application optimized in a parallel execution order may be executed asynchronously at runtime using promises to allow for non-blocking execution of the operations executed in parallel.

In some instances, the dependency model is specifically associated with implementation logic defined for the application. In those instances, execution of at least a first determination performed in the implementation logic is dependent upon on the execution output of a second determination performed in the implementation logic.

In some instances, the dependency model comprises a nested array of dependent operations of the application. In other instances, the dependency model comprises a text file defining at least one dependency between operations of the application or a data file including a list of dependent pairs of operations of the application.

In some instances, the dependency model is created separately from the application, where the dependency model is associated with the application for particular execution instances. In some instances, the dependency model defines at least one dependency associated with framework execution logic of the non-blocking application object framework.

In some instances, operations associated with the application in the non-blocking application object framework are performed asynchronously unless associated with a dependency defined in the dependency model.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 is an example set of dependency definitions and corresponding dependency determinations that can be automatically generated during analysis of a particular dependency model.

DETAILED DESCRIPTION

Figure 1:
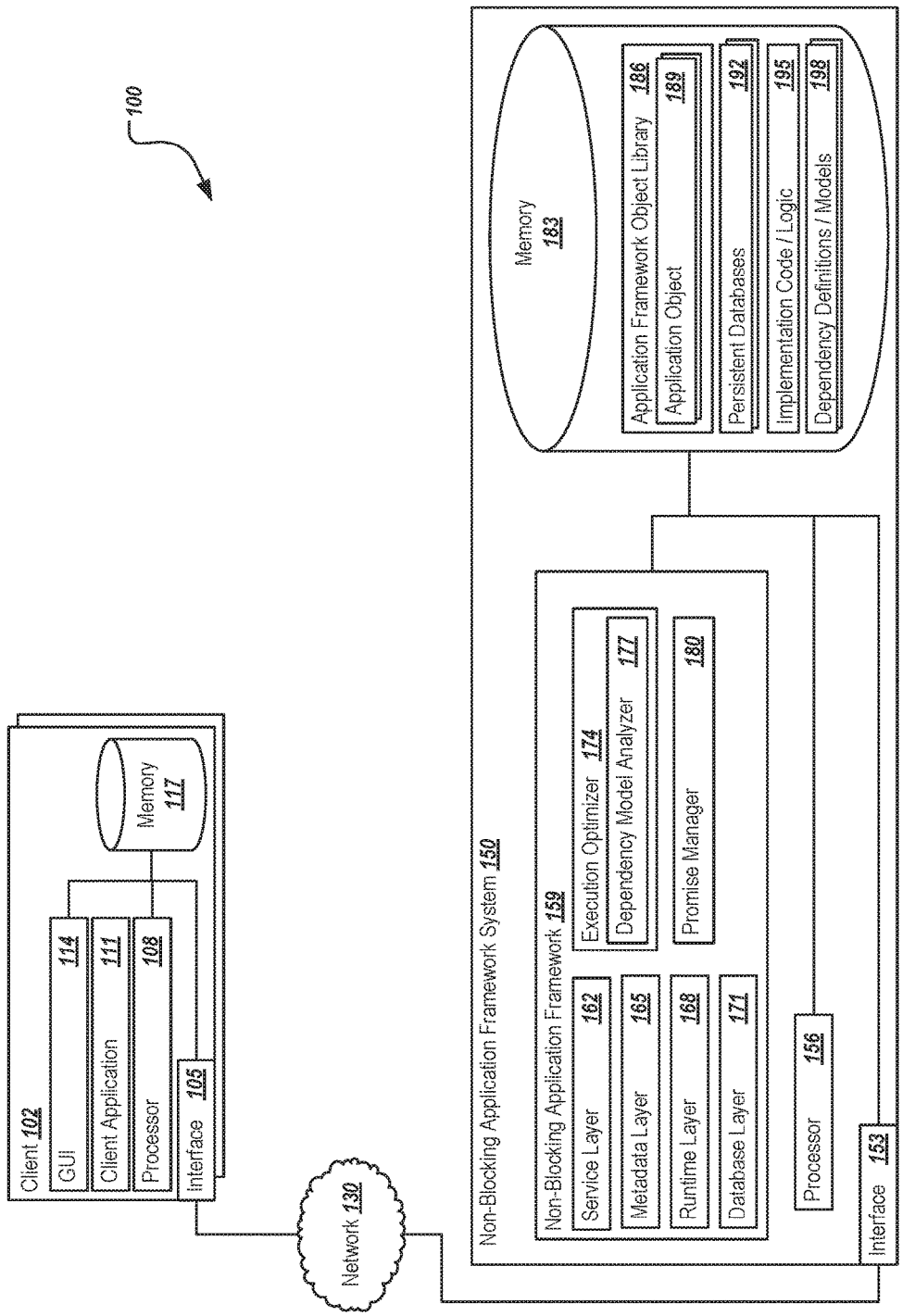
FIG. 1 is a block diagram illustrating an example system for providing a non-blocking application object framework (AOF) for executing application operations in parallel, while providing mechanisms for defining required dependencies to be respected during optimization and execution of the application.

The present disclosure relates to a non-blocking version of an Application Object Framework (AOF) running on a development platform using a non-blocking, event-driven I/O to remain lightweight and efficient in the face of data-intensive real-time applications that run across distributed devices. In some instances, the non-blocking AOF may be based on the Node.js technology, although any development platform supporting a non-blocking execution model may be used. In general, the non-blocking AOF is meant to provide a framework where blocking actions are limited and/or removed, such that calls in one or more of the layers of the framework can be parallelized to avoid the prior serialized execution concepts of previous AOF frameworks.

Advantages of the non-blocking AOF framework and the non-blocking operations are that the CPU(s) of the system can be kept busy and memory can be saved. The program does not halt when an I/O request is processed, allowing the CPU to be freed up to other requests within the non-blocking AOF. Such avoidance of delays dramatically increases the scalability and performance of the overall application resulting in better workload to the server machines as well as better parallel processing. Other benefits include seamless scalability and elasticity, increased responsiveness, optimal CPU workload, and better memory consumption, among others.

The non-blocking AOF generally moves from a system where most or all of the operational and functional calls were performed sequentially, and where the next operation was not called until a prior operation returned a value or other result. Within the non-blocking AOF, however, operations are called in parallel, allowing the system to perform asynchronous code and avoid the standard blocking results of a standard system. In one example, the concept of promises is used throughout the non-blocking AOF to allow calls to be made to particular operations and layers. When invoking these asynchronous operations, instead of an operation result a promise is returned. Promises are used to notify the result of an operation. The caller of the operation can register event handlers that are called after the execution of the asynchronous operation. In case of a successful asynchronous operation execution, the "done" or "then" callback handler can be executed. In case of an error during the asynchronous operation execution (e.g., a thrown exception), the "reject" or "catch" callback handler can be called.

When executed, the asynchronous code does not block the program or delay additional operations from being performed. Instead, the program can execute other statements and continue with the execution of the previous operation result when the callback function of the promise is called. Further, promises (or other asynchronous implementation options) can be chained using the "then" statement. By chaining promises throughout the lifecycle of an application executing in the non-blocking AOF, a complete promise hierarchy without any gaps may be generated or managed, allowing an efficient error handling ability, by catching the top-most promise's rejection. Functions not already prepared for returning promises (as opposed to results) can be adapted in promises by the framework. Collection functions executed by the non-blocking AOF can then make handling of the multiple asynchronous executions paths a relatively simple task. By enabling these asynchronous techniques within the non-blocking AOF, application object-specific implementation and business logic can be executed asynchronously and in parallel.

In some instances, particular known dependencies between operations performed between layers and/or within particular layers of the non-blocking AOF may be known to administrators and developers, where certain operations must be performed before or after other related operations in order to avoid the default setting of asynchronous code execution from causing data and/or processing issues in those dependent operations. As such, a declarative set of dependency rules or listings can be created by an appropriate party to ensure that such required dependencies are observed. While the non-blocking AOF will execute code asynchronously by default, those operations associated with the dependency rules will be handled synchronously and/or sequentially to ensure that the related operations are performed in the correct order. Similarly, operations that are not related or that do not specifically impact a different operation can be performed asynchronously in a non-blocking manner.

Based on the dependency rules, a dependency model can be generated. The dependency model can be used during optimization of the execution order for the application. In particular, while most of the operations are executed asynchronously, the operational optimizer can interpret and enforce the dependent operations of the application. As noted, the dependencies may be defined for any particular portions of the application and/or the operations of any of the particular layers of the framework. One example may be dependencies within the implementation logic of an application, such as business logic, operational functionality, or other aspects, where particular operations performed have effects on one or more other operations such that the order of the execution should be enforced. The dependency rules can be defined in any particular format, including a set of nested arrays, a text file with specific linkage between operations, a linked list or set of dependent pairs of operations defining specific relationships to be managed and upheld, where the list provides a predecessor/successor relationship, or any other suitable format. Using the dependency rules and model, the optimizer can determine particular synchronous activities within the application and allow the rest of the operations to be executed asynchronously in some instances.

Turning to the illustrated implementation, FIG. 1 is a block diagram illustrating an example system 100 for providing a non-blocking application object framework (AOF) for executing application operations in parallel, while providing mechanisms for defining required dependencies to be respected during optimization and execution of the application. System 100 is a single example of a possible implementation, with alternatives, additions, and modifications possible for performing some or all of the described operations and functionality. As illustrated in FIG. 1, system 100 is associated with a system capable of sharing and communicating information across devices and systems (e.g., client 102 and non-blocking application framework system 150) via network 130. Although components are shown individually, in some implementations, the functionality of two or more components, systems, or servers may be provided by a single component, system, or server. Further, additional components may be included in alternative implementations that perform at least a part of the functions of the illustrated components. For example, at least a portion of the components illustrated in memory 183 of the non-blocking application framework system 150 may be stored remotely from the system 150, or at another location accessible via network 130.

As used in the present disclosure, the term "computer" is intended to encompass any suitable processing device. For example, client 102 and non-blocking application framework system 150 may be any computer or processing device such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general purpose computers, as well as computers without conventional operating systems. Client 102 may be any system which can request data, execute an application, and/or interact with the non-blocking application framework system 150. The client 102, in some instances, may be a desktop system, a client terminal, or any other suitable device, including a mobile device, such as a smartphone, tablet, smartwatch, or any other mobile computing device. In general, each illustrated component may be adapted to execute any suitable operating system, including LINUX, UNIX, WINDOWS, Mac OS®, Java™, Android™, Windows Phone OS, or iOS™, any real-time OS among others.

The non-blocking application framework system 150 may be associated with the execution of one or more applications, or application objects 189, in a non-blocking application framework 159 as described above. The framework 159 may receive requests from client 102 (e.g., via client application 111) to an application object runtime in the application object framework 159. In some instances, the request may be routed to the non-blocking framework (e.g., Node.js) via a middleware component receiving and interpreting the request and matching the request URL to a particular application object runtime associated with the system 150. A dispatcher of the middleware can branch the calls to particular receiving locations based on the request protocol type (e.g., REST protocol or OData protocol). The corresponding application object 189 and its associated metadata can be instantiated by loading the corresponding application object's library file in the application framework object library 186 matching the request (e.g., the request URL). The framework 159 can then instantiate the application object's runtime (e.g., via the runtime layer 168) using the loaded metadata (e.g., obtained via the metadata layer 165) and the provided database connection (e.g., via the database layer 171). The runtime layer 168 can provide access to CRUD (create, read, update, delete) services of the application object 189, running the implementation logic 195 associated with the object in a non-blocking way.

The database layer 171 provides an abstraction to the specific database technology used (e.g., SAP's HANA) and maps the results of the implementation logic to modifications to the database tables 192 and any other persistent files or databases associated with the particular application object 189 instance. Complex computations can be performed in parallel as part of the application object's logic via parallel execution of SQL script procedures as managed by the non-blocking application framework 159.

The user of client 102 accesses the non-blocking application object framework via a UI layer (e.g., part of the client application 111) which provides easy-to-use access, such as by leveraging out-of-the-box and/or customized UI5 models for building the user interface, integrating the remote communications to the non-blocking application object within the operational code of the application.

In general, the database layer 171 handles data retrieval from the tables and entities associated with the application, and can perform transformations of data from a table data representation into an object representation, and vice versa, as needed.

The metadata layer 165 manages the metadata definitions associated with different application objects 189. As objects share common behavior and common interface definitions, the metadata layer 165 can implement the appropriate metadata once after generically evaluating specific application object's metadata for future instantiations of the application object 189. The metadata can abstract from the implementation and give access to a standardized interface. As application objects 189 may not be flat data containers, but can instead logically consist of many data tables, the metadata layer 165 can manage the application object 189 and its structure. The metadata layer 165 can define the structural object definition (e.g., node hierarchy, node attributes, and actions) associated with a particular application object 189 prior to and upon instantiation. Additionally, the metadata layer 165 can determine, evaluate, and validate schema definitions for various application objects 189.

The runtime, or implementation, layer 168 interprets a set of implementation code or logic 195 that is specific to each application object 189. The implementation logic 195 can be specific to particular application objects 189 and/or application object types. The implementation logic 195 can be executed on a current state of the application object instance, such that the implementation logic 195 can change depending on the object instance's current state. In some instances, the implementation logic 195 may be separated into different categories, including determinations, checks/validations, actions, and properties.

Determinations represent logic that is executed during CRUD core services, particularly create, update, read, and delete operations. Determination operations can modify the current object instance, and may be associated in some instances with one or more dependency definitions 198.

Checks and/or validations are performed on each level of an object definition (e.g., object, nodes, and attributes) to check the inner consistency before persisting an object instance. Further, authorization checks may allow or forbid certain core services or actions calls for certain consumers or users.

Actions represent higher level implementation logic chunks that may be directly executed a call, e.g. via a defined action interface, by passing expected parameters. Actions can modify the current object instance based on the current state and the passed parameters as long as the inner consistency of the application object is ensured.

Properties are a standardized format of conveying information about the current object state to the application object caller. For example, the properties can tell a consumer/user if the object instance can be updated or deleted before the consumer/user executes those core services or actions. The information can be used to pro-actively inform the user at, e.g., the client 102, which tasks can be performed in the object instance's current state. Custom properties can allow the application object implementer to pass arbitrary information to the user/consumer as desired.

The runtime layer 168 may provide a generic interface to the application consisting of the CRUD actions, which may be executed by a runtime engine (not shown) based on the associated metadata definition of the instantiated application object 189. Additional core services (e.g., custom actions, generic object copy, etc.) may be provided out of the box. Further, the runtime layer 168 may provide a consumer/user with a local API to work with the application object (e.g., to execute CRUD core services or actions).

A service layer 162 can manage the initial instantiation of particular application objects 189 from the application framework object library 186 (i.e., where one or more application objects 189 and their definitions/parameters are stored. In addition to the instantiation of the application object, the service layer 162 can serve as a central module to perform execution of the application object services, including CRUD services, actions, properties, etc. The service layer 162 acts as a core of the application framework 159, brining client consumption and database persistence together. In particular, the service layer 162 can initially access file systems within the application framework 159 to access the library 186 and the particular application objects 189 called by the consumer/user. In some instances, an exposure layer (not shown) may be provided to offer client access to one or more of the application objects 189. Application objects 189 can be exposed via local and/or remote client access, such as via a RESTul protocol or via OData. In some instances, the client application 111 of client 102 can access the application object via HTTP protocol. Application object instances can, in some instances, be pushed to the client 102 via remote web socket streams to the UI of the client application 111.

A user interface (UI) layer can be provided to allow access to the particular application objects 189 and the non-blocking application object framework 159. The UI layer may be provided as the client application 111 executing at the client 102, or the UI layer may be provided as a web-based application remotely accessed by the client application 111, such as where the client application 111 represents a web browser or web browsing-capable application. The client application 111 can wrap the exposed remote service calls associated with the application, and then can use efficient UI technologies such as model binding to transparently bind user interface elements against the application object's implementation in the backend application. In response to data changes within the client application 111, for example, such changes can be automatically (e.g., immediately or delayed) synchronized with the backend persistency via the application object framework 159. Similarly, if the persistency data in the database tables of the one or more databases 192 changes, the user interface elements of the client application 111 may also be updated transparently.

As described herein, the non-blocking application framework 159 allows operations associated with particular application objects 189, including the instantiation thereof based on related metadata and the corresponding operations to do that, to be performed asynchronously via the use of promises. Promise manager 180, which may be an embedded component or functionality of the framework 159, can manage the use and execution of operations via the asynchronous execution of the multiple promises. In essence, the non-blocking application framework 159 can call the operations associated with the instantiation and execution of particular application objects 189 in parallel using the promise mechanism to avoid blocking behavior on the part of its components. In doing so, asynchronous operations can be invoked, where those asynchronous operations return promises (managed by the promise manager 180) instead of result values. As the asynchronous processes are executed, the returned promises can be used to register event handlers called once the operations are complete. As those operations complete, the event handlers are called and results associated with the promises are returned. In general, almost any of the operations associated with application objects 189 in the non-blocking application framework 159 can be executed using promises. However, some knowledge as to one or more dependent operations performed at some location within the framework 159 may be known.

Based on these known dependent operations, a dependency definition can be declaratively created by a developer to ensure operations are performed in a sequential manner where the effects of such operation change the way a later operation is to operate. The dependency definitions 198 may be prepared by a developer, administrator, or consumer and can include a set of dependencies between operations that must be maintained within operations of the application. In some instances, the dependency definition 198 may be one or more nested arrays, a text file providing defined dependent relationships, a linked list or other data file providing predecessor and successor operations, or any other suitable format. An example of a dependency definition 198 is provided in FIG. 5 and described later. The dependency definition 198 can be used by the framework 159, and specifically, an execution optimizer 174, prior to executing the operations associated with a particular application or application object 189. The execution optimizer 174 may be a standard or existing optimizer associated with the framework 159, or may be a new component. The optimizer 174 can determine particular execution orders of the one or more asynchronous aspects of the application object 189 and its calls within the framework 159. Included in the execution optimizer 174 is a dependency model analyzer 177 for interpreting the declarative dependency definitions 198 and generating a dependency model based on those dependencies. The dependency model is analyzed by the dependency model analyzer 177 to identify the required dependencies of the application object 189, and apply those dependencies during the execution optimization process of the execution optimizer 174. For example, if one or more determinations within the implementation logic 195 are dependent on one another as declared in the dependency definition 198, the analyzer 177 will notify the optimizer 174 to ensure that such operations are not executed asynchronously to one another, but instead execute the operations in a dependent manner to assure the known dependencies are respected and applied.

Once all dependencies are determined and applied by the execution optimizer 174, an execution order for the operations of the application is generated. Execution of the operations are performed by the respective layers of the non-blocking application framework 159, and the promise manager 180 assists with the management, registration, and resolving of the various promises and promise changes. The framework 159 can execute any synchronous operations to ensure the dependencies are met, and can return those results in combination with the asynchronous operation results upon resolving the operations.

Benefits of the non-blocking application framework 159 are seen throughout the various layers of the framework 159. As mentioned, the runtime layer 168 includes checks, properties, actions, and determinations. Checks may, in most cases, be executed in parallel, as they do not modify the application object instance's internal state or any object data. Checks instead are transient operations for reporting messages in case of inconsistencies in the instantiated object. Properties can generally be collected in parallel from static and dynamic properties asynchronously and in parallel, as most properties are distinct form one another, and property functions only update a corresponding part of a property result object returned to the consumer/caller. Actions are generally allowed to run asynchronous code as they are implemented by a single implementation function, where the implementation decides which parts of the execute function are to be executed in parallel or sequential order.

Determinations within the runtime layer 168 and the implementation code 195 provide key portions of the business or implementation logic for a particular application. By default, determinations can be executed asynchronously to take advantage of the framework 159 capabilities. However, where operations within the implementation code 195 and logic are known to have specific dependencies, or operate on the same data element in the object data, specific dependencies can be declared by developers and logic experts within a dependency definition associated with the determinations. FIG. 5 provides an example nested array of determinations 505. The nested array 505 specifies the determination hierarchy and its dependencies, which is also represented in nested array 510 (in a more manageable illustration). Based on these dependencies, it can be determined that particular dependencies exist that will require a sequential or synchronous execution of particular determinations. Based on the illustrated nested arrays 505, 510, a determination execution order 515 can be determined, e.g., by the execution optimizer 174. As illustrated, fnDeterminationX and fnDeterminationY need to be executed first, as fnDetermination1 and fnDetermination2 are dependent upon their outcome. However, because fnDeterminationX and fnDeterminationY are not dependent on one another, those operations can be ordered in parallel and executed asynchronously. None of the other listed determinations will be performed until fnDeterminationX and fnDeterminationY have completed. Upon completion, fnDetermination1 and fnDetermination2 can then be executed based on the output or operations of fnDeterminationX and fnDeterminationY. Again, because fnDetermination1 and fnDetermination2 are not dependent upon one another, those determinations can be executed in parallel. Once those determinations are both resolved, the final set of determinations, fnDeterminationA and fnDeterminationB, can be executed. As neither fnDeterminationA nor fnDeterminationB are dependent on one another, both can be executed in parallel once the operations of fnDetermination1 and fnDetermination2 are complete. While the example here is specific to determinations, the extensibility of the framework 159 can allow for any dependencies within the framework 159 to be declared and maintained, both within or outside of the implementation code 195. Once the determinations are resolved (either synchronously or asynchronously), a set of consistency checks may be executed asynchronously in parallel to ensure that the object instance is consistent with its requirements and can be persisted.

The database layer 171 may benefit from the non-blocking architecture as well. In particular, as application objects 189 consist of a node hierarchy, each node must be transformed into a corresponding database table. The application object node instance data may also need to be inserted, updated, or otherwise acted upon in several different database tables. Using the parallelized operations of the framework 159, database SQL statements can be prepared and executed in parallel as opposed to traditional systems' sequential execution due to the blocking aspect of prior frameworks. Further, when writing to history tables, the tracking of delta changes can be efficiently parallelized by the framework 159. When reading object instances which consist of several object nodes, each mapped to different database tables, the database layer 171 can efficiently parallelize database calls without the need to ensure transactional consistency between different reads of the data (as it is all collected at the same time).

The metadata layer 165 may also benefit from the non-blocking aspects of the framework 159. As the metadata layer 165 derives metadata information from the database entities of database 192 (e.g., tables, views, etc.), the retrieval of metadata information (e.g., column names, types, etc.) can be executed asynchronously and in parallel, as the calls do not interfere with each other. The default parallelization allows the metadata layer 165 to greatly increase the speed of its access and interpretation of the databases 192 in generating and interpreting tables and other entity metadata.

The exposure layer may also benefit. Requests provided or received via the exposure layer can be processed in batch. A multipart request may consist of several HTTP requested bundles in a single HTTP request. The request can be split by the non-blocking application object framework and executed asynchronously in parallel. The results of each request can be called, and the batch request is returned once all requests have been processed. Previous solutions required the requested to be processed in sequence and could not leverage the capabilities of multiple CPUs. The non-blocking application object framework enables the client to run multiple requests from the UI (or client application 111) to the database out of the box and without development overhead for large performance improvements.

Figure 2A:
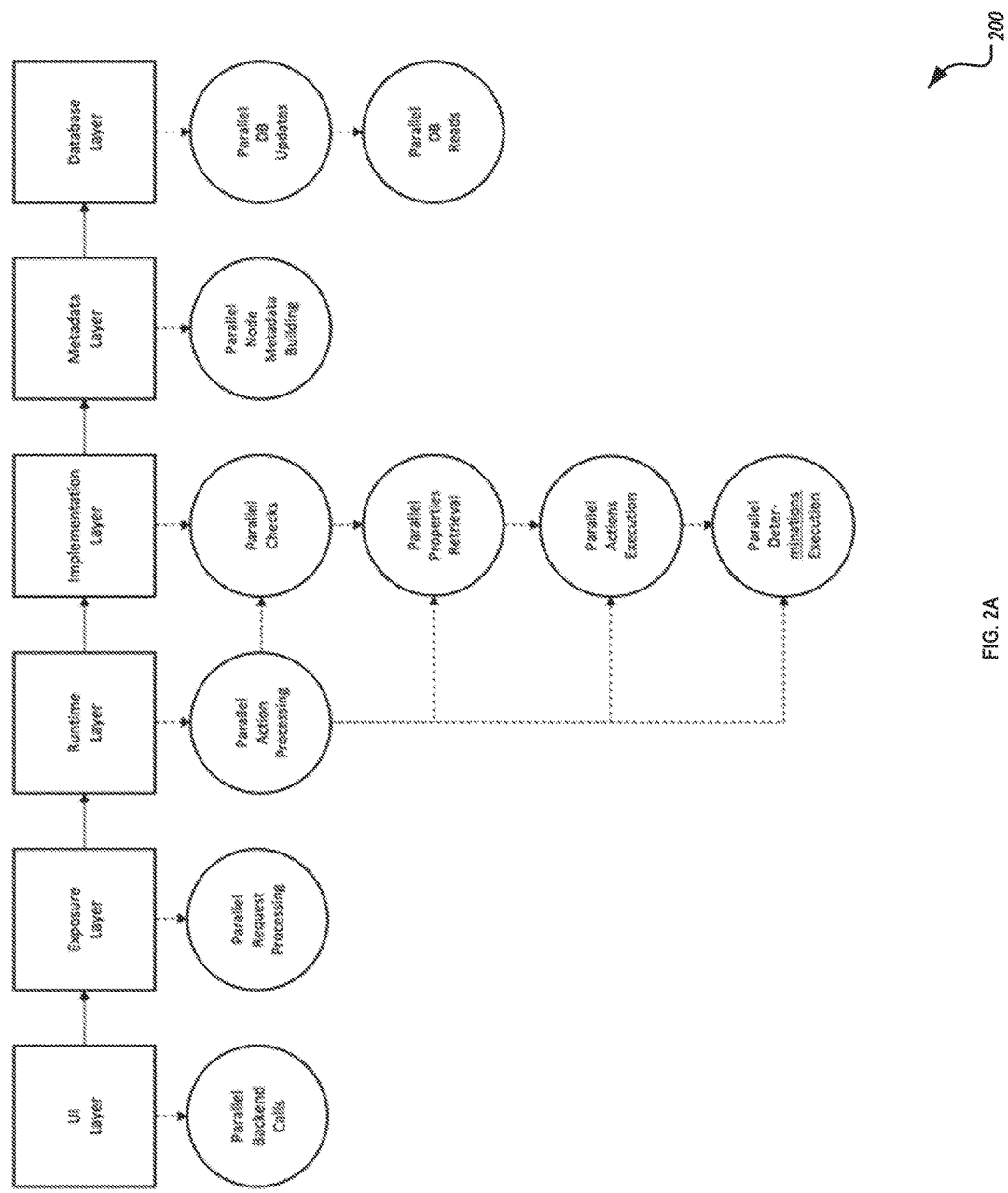
FIG. 2A illustrates an example of the parallel execution that can be performed in the non-blocking application object framework.

FIG. 2A illustrates an example of the parallel execution that can be performed in the non-blocking application object framework. At the UI layer, parallel backend calls can be made to the application. At the exposure layer, parallel request processing can be performed as described. At the runtime and implementation layers, parallel action processing may be performed (e.g., based on instructions received via the client application 111 and through user interactions) to perform parallel checks, property retrievals, action executions, and determination executions. At the metadata layer, parallel node metadata building operations can be performed. At the database layer, parallel database updates and reads can be performed, as needed. As described, while the default operations of the non-blocking application object framework is to execute operations in parallel, the declarative dependency definitions can be considered when determining the execution order of particular operations throughout the framework, including determinations, action processing, and/or other operations throughout the framework.

Figure 2B:
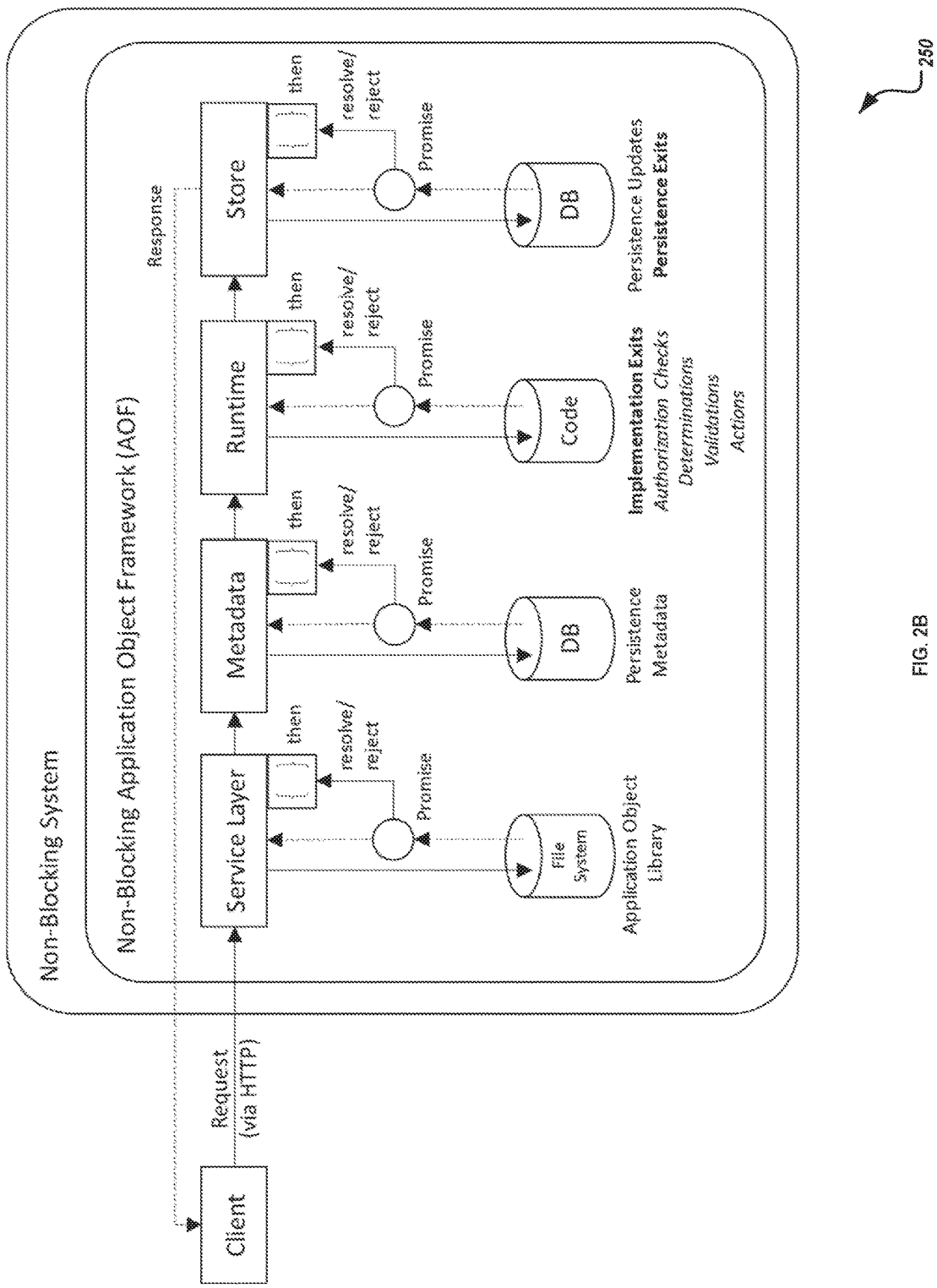
FIG. 2B is a block diagram illustrating an example execution process for an application within a non-blocking AOF.

FIG. 2B provides an illustration of an example execution process for an application within a non-blocking AOF. As illustrated, the non-blocking AOF is internal to a non-blocking system (e.g., system 150), where a client's request (here, e.g., via an HTTP request) to execute a particular application is received. The request may identify a particular URL associated with corresponding to a particular application object and/or action or activity associated with a particular application object. In response to the request, the non-blocking AOF can begin to execute the one or more parallel and asynchronous actions required to load and execute the requested application object.

The illustrated service layer can access the application object library from the file system, while the metadata layer can obtain, read, and instantiate metadata associated with the application object. The various calls and activities of the service and metadata layers can be performed using asynchronous calls, and particularly, can return promises in response to calls to allow for additional asynchronous calls to be made. Each of the promises, or in some cases, chains of promises, can be registered such that as those promises are resolved (e.g., based on the completion of the operations associated with a particular promise), the corresponding layer can include and access such operational results. In instances of chained promises, the resolved operations can be provided in connection with the other resolved operations to complete the chained tasks. The non-blocking AOF can perform the optimization operations associated with the various calls of the different layers to provide an optimized execution path. As various operations may not affect or influence later operations, the non-blocking AOF can allow such calls to be made asynchronously and allow the results of those operations to be returned over time.

The runtime layer allows the code associated with the underlying application object to be executed. Various implementation exists as previously described may exist in or associated with the code, including authorization checks, determinations, validations, and actions. In some instances, the determinations may provide a special case where one or more of the determinations may directly influence at least one other determination in the code. Such interactions are known to advanced users who can then define one or more dependency definitions, a declared listing of dependencies that must be followed based on the logic of the underlying application object and its code. In optimizing the runtime layer's operations, the non-blocking AOF can access and interpret the dependency definition to generate a dependency model (alternatively, the dependency definition may be in a dependency model format, or a format otherwise readable and/or usable by an execution optimizer of the non-blocking AOF to apply the defined dependencies). In some instances, only determinations may be associated with particular dependencies, while in other instances, other types of implementation exits and/or other layers may be affected or required to be performed in a particular order. The non-blocking AOF may be capable of accepting and applying dependency definitions associated with any of the layers or operations associated therewith. The runtime layer can then execute any non-dependent operations in parallel using the promise mechanisms. Further, any dependent operations may be synchronously executed to ensure that the dependency is maintained. The runtime layer can apply any dependent results to the successor operations and ensure that predecessor operations are applied to any dependent successor operations. In some instances, once the determination operations are performed, one or more checks on the resultant data can be performed to ensure such operations are allowed and meet the requirements of the application object instance and its metadata.

The store or persistency layer persists the results of the runtime layer to the persistent databases associated with the application object. Operations associated with storing particular data may be associated with different tables, such that the write or update operations can be parallelized by the non-blocking AOF. Similar to other operations in other layers, the operations performed by the store layer can be associated with promises, such that the operations are not completed until the necessary data or operations are fully processed and available.

Returning to FIG. 1, the non-blocking application framework system 150 includes, in addition to the framework 159, an interface 153, a processor 156, and a memory 183. Interface 153 is used by the system 150 for communicating with other systems in a distributed environment—including within the environment 100—connected to the non-blocking application framework system 150 and/or network 130, e.g., clients 102, as well as other systems communicably coupled to the network 130. Generally, the interface 153 comprises logic encoded in software and/or hardware in a suitable combination and operable to communicate with the network 130 and other communicably coupled components. More specifically, the interface 153 may comprise software supporting one or more communication protocols associated with communications such that the non-blocking application framework system 150, network 130, and/or interface's hardware is operable to communicate physical signals within and outside of the illustrated environment 100.

Network 130 facilitates wireless or wireline communications between the components of the environment 100 (e.g., between the system 150 and the client 102, among others) as well as with any other local or remote computer, such as additional mobile devices, clients, servers, remotely executed or located portions of a particular component, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the system 150) may be included within network 130 as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n/ac, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

The system 150 also includes one or more processors 156. Although illustrated as a single processor 156 in FIG. 1, multiple processors may be used according to particular needs, desires, or particular implementations of the environment 100. Each processor 156 may be a central processing unit (CPU), an application specific integrated circuit (ASIC), a field-programmable gate array (FPGA), or another suitable component. Generally, the processor 156 executes instructions and manipulates data to perform the operations of the application framework system 150, in particular those related to executing application object instances in a non-blocking manner. Specifically, the processors 156 execute the algorithms and operations described in the illustrated figures, as well as the various software modules and functionality, including the functionality for sending communications to and receiving transmissions from clients 102, as well as to other devices and systems. Each processor 156 may have a single core or multiple cores, with each core available to host and execute an individual processing thread. To perform the parallel and asynchronous processing as described herein, multiple cores may be available within the framework system 150. In some instances, a cloud-based solution may use one or more remotely or otherwise available processors 156 and their cores to allow for further optimization via parallel processing and requests. As noted, the processors 156 execute the operations of and those associated with the non-blocking application framework 159 in executing a particular application, application object 189, or application object instance.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JAVASCRIPT, Java™, VISUAL BASIC, assembler, Perl®, any suitable version of 4GL, as well as others.

System 150 further includes memory 183. Memory 183 may represent a single memory or multiple memories. The memory 183 may include any memory or database module and may take the form of volatile or non-volatile memory including, without limitation, magnetic media, optical media, random access memory (RAM), read-only memory (ROM), removable media, or any other suitable local or remote memory component. The memory 183 may store various objects or data (e.g., the application framework object library 186 and its various application objects 189, one or more persistent databases 192, implementation code 195 associated with particular application objects 189 and to be executed at runtime, and one or more dependency definitions 198 associated with particular application objects 189, etc.), including financial data, user information, administrative settings, password information, caches, applications, backup data, repositories storing business and/or dynamic information, and any other appropriate information associated with the system 150 including any parameters, variables, algorithms, instructions, rules, constraints, or references thereto. Additionally, the memory 183 may store any other appropriate data, such as VPN applications, firmware logs and policies, firewall policies, a security or access log, print or other reporting files, as well as others.

As illustrated, one or more clients 102 may be present in the example system 100. Each client 102 may be associated with requests for application object instance executions received by the framework system 150 and associated with one or more of the application objects 189. As illustrated, the client 102 may include an interface 105 for communication (similar to or different from interface 153), a processor 108 (similar to or different from processor 156), the client application 111, memory 117 (similar to or different from memory 183), and a graphical user interface (GUI) 114.

The illustrated client 102 is intended to encompass any computing device such as a desktop computer, laptop/notebook computer, mobile device, smartphone, personal data assistant (PDA), tablet computing device, one or more processors within these devices, or any other suitable processing device. In general, the client 102 and its components may be adapted to execute any operating system, including LINUX, UNIX, WINDOWS, Mac OS®, Java™, Android™, or iOS. In some instances, the client 102 may comprise a computer that includes an input device, such as a keypad, touch screen, or other device(s) that can interact with the client application 111, and an output device that conveys information associated with the operation of the applications and their application windows to the user of the client 102. Such information may include digital data, visual information, or a GUI 114, as shown with respect to the client 102. Specifically, the client 102 may be any computing device operable to communicate queries or communications to the framework system 150, other clients 102, and/or other components via network 130, as well as with the network 130 itself, using a wireline or wireless connection. In general, client 102 comprises an electronic computer device operable to receive, transmit, process, and store any appropriate data associated with the environment 100 of FIG. 1.

GUI 114 of the client 102 interfaces with at least a portion of the environment 100 for any suitable purpose, including generating a visual representation of the client application 111. In particular, the GUI 114 may be used to present results of queries or executions associated with particular application objects 189. GUI 114 may also be used to view and interact with various Web pages, applications, and Web services located local or external to the client 102. Generally, the GUI 114 provides the user with an efficient and user-friendly presentation of data provided by or communicated within the system. The GUI 114 may comprise a plurality of customizable frames or views having interactive fields, pull-down lists, and buttons operated by the user. For example, the GUI 114 may provide interactive elements that allow a user to view or interact with information related to the operations of processes associated with the framework system 150. In general, the GUI 114 is often configurable, supports a combination of tables and graphs (bar, line, pie, status dials, etc.), and is able to build real-time portals, application windows, and presentations. Therefore, the GUI 114 contemplates any suitable graphical user interface, such as a combination of a generic web browser, a web-enable application, intelligent engine, and command line interface (CLI) that processes information in the platform and efficiently presents the results to the user visually.

In general, client application 111 may be any mobile application. In the illustrated example, the client application 111 may be a web browser, mobile application, or dedicated remote application or software capable of interacting with application objects 189 via the framework system 150 (through, in this instance, network 130).

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 3:
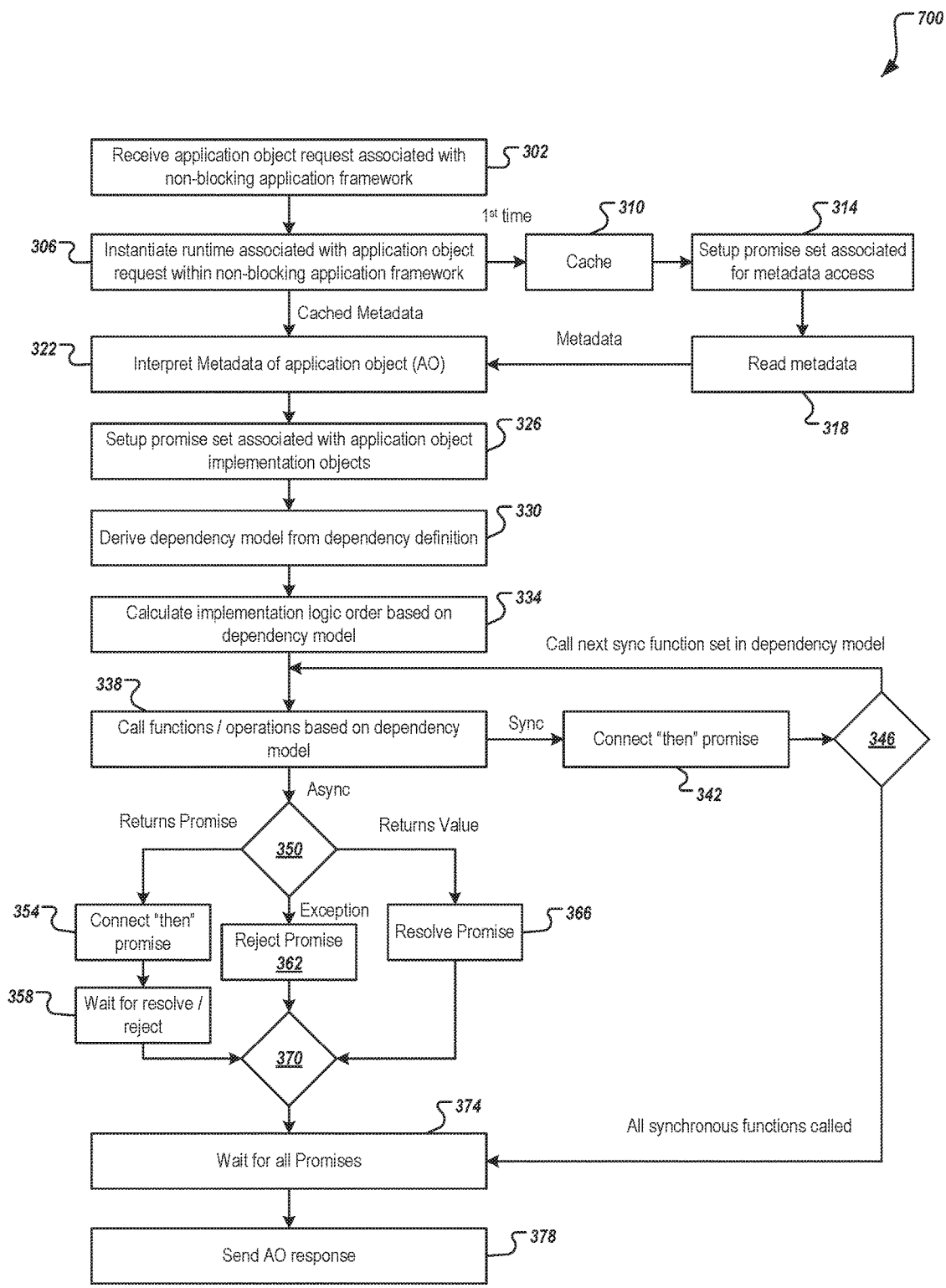
FIG. 3 is an example flowchart of a process for preparing and executing an application in response to an application object request in a non-blocking AOF.

FIG. 3 is an example flowchart of a process 300 for preparing and executing an application in response to an application object request in a non-blocking AOF. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 302, an application object request is received, the application object associated with a non-blocking application framework. At 306, a runtime associated with the application object request is instantiated within the non-blocking application framework, where the application object instance can be executed in a non-blocking manner as described herein. If the application object is being instantiated for a first time, method 300 continues at 310 where the instantiated object is cached for future instantiations. At 314, a promise set associated with metadata access is setup, where the promise set is associated with the operations related to instantiating the application object instance and accessing and enriching the instance with the associated metadata. By providing the promise set as described, the operations associated with accessing the metadata (e.g., accessing one or more database tables storing metadata information) and adding the metadata to the instantiated application object do not block one another from calling a next operation asynchronously. At 318, the metadata is read from the metadata information and method 300 continues at 322. If the metadata associated with the application object instance has already been cached, method 300 can move from 306 to 322 without requiring further metadata access operations. At 322, the accessed metadata of the application object is interpreted and used to enhance the application object instance.

At 326, a promise set associated with the application objects implementation objects and operations is set up. The promise set is a construction of the promise context. As such, the asynchronous implementation logic can be chained into the current logic flow. The promise set can handle various situations, such as accepting synchronous and asynchronous code, handling error propagations, and connecting multiple promises to a "Promise.all" construct or sequencing the application logic into the already existing application flow. The promise set can be used to asynchronously call and execute particular non-dependent operations within the implementation or runtime layer, as well as set up the synchronous execution of any dependent interactions and operations. In some instances, a set of dependencies may be defined within a dependency definition, a declarative listing of dependencies provided by an administrator, developer, or other domain expert. The dependency definition may be associated with particular application objects, and can be used to ensure that one or more sets of operations (e.g., pairs) generating dependent results and/or relying on prior results from a particular operation(s) are executed in such a manner as to allow those dependencies to be honored. The dependency definition, which may be defined in any suitable format, including plain text, nested array, linked lists, spreadsheet or database table defining predecessor and successor relationships, etc., may be in a first format. In those instances, a dependency model can be derived from the dependency definition at 330. The derivation may be a simple formatting or translation to a second format interpretable by the non-blocking framework. In some instances, the first format and the second format may be the same, such that a dependency model to be used is the same as the dependency definition (or with minor changes without changing the format of the file/document/table/etc. of the dependency definition).

At 334, an implementation logic order is calculated based on the dependency model. Where no dependencies exist, most or all of the implementation logic and code can be performed asynchronously via parallel processing. However, where a dependency model is available from a defined dependency definition, an updated or revised execution order needs to be generated that takes into consideration those dependencies. Such executions may still use a promise, but will be required to complete sequentially before the dependency operation may execute. For non-dependent operations (e.g., those not included in and/or not affected by the dependency definition), a sequence of parallel executions can be calculated for the execution order. In general, promises sets will be generated in both parallel and sequential processing operations. Promise sets can be handle and be set to manage parallel execution, sequential execution, error path handling, or a combination thereof, such as where the dependencies are defined by the declarative dependency model.

At 338, the functions and operations of the application object instance are called based on the calculated implementation logic order, which in turn is based at least in part on the dependency model. For synchronous (or sequential) operations, method 300 continues at 342 where the synchronously called function can be connected to or associated with a "then" promise, where the connection or association ensures that the dependency from the execution of the predecessor operation is connected to the successor operation within the dependency definition. At 346, a determination is made as to whether additional synchronous functions or sets of functions are required by the dependency model and the execution order. If so, method 300 returns to 338. If all synchronous functions/operations have been called such that the declared dependencies will be met, the synchronous portion of the execution is complete and method 300 continues to 374 where all promises are awaited to be fulfilled.

Returning to 338, for asynchronous calls and functions, method 300 continues to 350. At 350, a determination is made as to whether a particular operation returns a promise, a value, or an exception. Because the promise set can integrate synchronous code into the execution chain. Where some code is relatively very simple and does not need to access heavy logic or resources (e.g., database accesses, HTTP calls). Therefore, the computation does not necessarily need to be split up to be executed asynchronously. Therefore, the promise set can chain this code directly without having a separate promise. The already set up promise set takes care of this chaining and allows the operation to be performed along with the operations associated with promises. In some cases, the execution code also only exists as a constant value or simple math-based calculation. This can be treated like synchronous code and directly chained into the existing promise set, where such operations directly return a value as opposed to another promise. If the operation returns a promise, method 300 continues at 354, where the operation is connected to a "then" promise. At 358, the method 300 waits for a resolve or rejection of the promise before moving to 370. If an operation returns an exception, at 362 the promise is rejected. If the operation returns a value, at 366 the asynchronously called promise is resolved and method 300 continues to 370. At 374, the method 300 waits for all promises to be completed, both those operations associated with asynchronous calls (i.e., those from 370) and those associated with synchronous calls (i.e., from 346). Once all promises are returned, the results of the application object instance's execution are complete and an application object response is generated. At 378, that response can be returned in response to the received application object request of 302.

Figure 4:
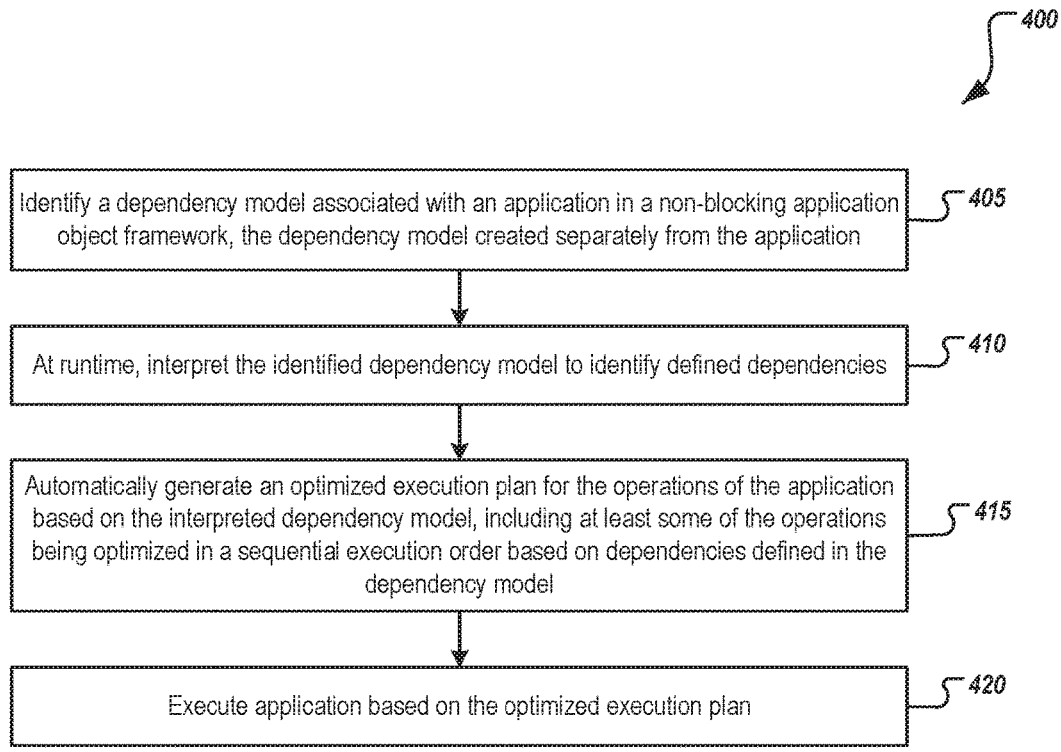
FIG. 4 is an example flowchart of a process for applying a particular dependency model to an execution of an application in a non-blocking AOF.

FIG. 4 is an example flowchart of a process 400 for applying a particular dependency model to an execution of an application in a non-blocking AOF. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a dependency model associated with an application or application object in a non-blocking application object framework is identified, where the dependency model is created separately from the application. In some instances, the dependency model may be defined by a developer or administrator associated with the application, or another expert or person knowledgeable in the operation of the underlying logic or execution of the application. In some instances, the dependency model may be associated with particular instances of an application object as opposed to all instances. In other instances, the dependency model may be associated with particular variations of a particular application object, or with particular users having particular roles. In some instances, the dependency model is specifically associated with implementation logic of the particular application or application logic, while in other instances, the dependency model may be defined at a framework level, where the dependencies are associated with functions or operations performed at layers other than the implementation layer as described herein.

In some instances, the dependency model may be specifically associated with one or more determinations performed in the implementation logic, where the execution of at least a first determination is declared as dependent upon the execution of at least a second determination. Any such dependencies may be declared and used by the dependency model.

In some instances, the dependency model may be generated based on a dependency definition. In those instances, the dependency definition may be in a first format where the dependency model is in a second format different from the first. In some instances, a dependency model may be available without a translation of a different dependency definition.

The dependency model may be a nested array of at least two dependent operations of the application. In some instances, different hierarchical layers of the nested array may identify two or more determinations that are successors to (or dependent on) at least one predecessor determination. Other formats for the dependency model and/or any dependency definitions may also include a plain text definition of dependent relationships, a text file, a data file or table identifying the dependent relationships, a list of dependent pairs of operations, or any other suitable format.

At 410, the identified dependency model is interpreted to identify the defined dependencies. At 415, an optimized execution plan is automatically generated for the operations of the application based on the interpreted dependency model. The optimized execution plan includes at least some of the operations being optimized to require a sequential and/or synchronous execution order based on the dependencies defined in the identified dependency model. For those operations not associated with or included in the dependency model, the optimized execution plan can allow or define an asynchronous execution of those operations to allow for parallel processing of the operations. In other words, a default execution order of the non-blocking application object framework may be for operations to be asynchronously executed. To provide the asynchronous operations, a promise mechanism may be used. In some instances, the promise mechanism may also be used for synchronous execution by chaining promises sequentially to one another. Any other suitable asynchronous or synchronous method of execution may be used in the alternative.

At 420, the application is executed based on the optimized execution plan generated at 415. The optimized execution plan can be transparent to users of the application, such that a request is called and a response is provided without an indication of how the synchronous and asynchronous calls and operations are performed. As noted, the dependency model may define dependencies at any suitable layer of the application's execution, including those related to instantiation of the application object and/or the accessing and applying of application object metadata. Execution of the application can include the operations performed in the order as required by the dependency model.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   identifying a dependency model associated with an application in a non-blocking application object framework, wherein the application is associated with a plurality of operations, and wherein the dependency model defines at least one dependency between at least two of the operations of the application;
   at runtime of the non-blocking application object framework, interpreting the identified dependency model;
   automatically generating an optimized execution plan of the application in the non-blocking application object framework based on the interpreted dependency model, including:
      identifying at least a first portion of the operations of the application as dependent operations;
      optimizing the dependent operations in a sequential execution order based on dependencies defined in the dependency model;
      identifying a second portion of the operations of the application as non-dependent operations that are not associated with defined dependencies in the identified dependency model;
      optimizing the non-dependent operations, wherein optimizing the non-dependent operations includes:
         configuring a promise set for at least some of the non-dependent operations, wherein the promise set enables parallel execution of the non-dependent operations, and wherein each promise enables a callback handler to be called for notification of completion of a non-dependent operation;
         identifying a first non-dependent operation that is not associated with a promise of the promise set and is either a constant value or a math-based computation; and
         chaining the first non-dependent operation to a second non-dependent operation that is associated with a promise of the promise set, so that the first non-dependent operation is executed synchronously with the second non-dependent operation; and
   executing the application in the non-blocking application object framework based on the optimized execution plan.

2. The method of claim 1, wherein the first portion of the operations of the application optimized in a sequential execution order is executed synchronously during execution of the application.

3. The method of claim 1, wherein the dependency model is specifically associated with implementation logic defined for the application.

4. The method of claim 3, wherein the dependency model is specifically associated with one or more determinations performed in the implementation logic, wherein execution of at least a first determination performed in the implementation logic is dependent upon the execution output of a second determination performed in the implementation logic.

5. The method of claim 1, wherein the dependency model comprises a nested array of dependent operations of the application.

6. The method of claim 1, wherein the dependency model comprises a text file defining at least one dependency between operations of the application or a data file including a list of dependent pairs of operations of the application.

7. The method of claim 1, wherein the dependency model is created separately from the application, and wherein the dependency model is associated with the application for particular execution instances.

8. The method of claim 1, wherein the dependency model defines at least one dependency associated with framework execution logic of the non-blocking application object framework.

9. The method of claim 1, wherein operations associated with the application in the non-blocking application object framework are performed asynchronously unless associated with a dependency defined in the dependency model.

10. A system comprising:
    at least one processor; and
    a memory communicatively coupled to the at least one processor, the memory storing instructions which, when executed, cause the at least one processor to perform operations comprising:
    identifying a dependency model associated with an application in a non-blocking application object framework, wherein the application is associated with a plurality of operations, and wherein the dependency model defines at least one dependency between at least two of the operations of the application;
    at runtime of the non-blocking application object framework, interpreting the identified dependency model;
    automatically generating an optimized execution plan of the application in the non-blocking application object framework based on the interpreted dependency model, including:
       identifying at least a first portion of the operations of the application as dependent operations;
       optimizing the dependent operations in a sequential execution order based on dependencies defined in the dependency model;
       identifying a second portion of the operations of the application as non-dependent operations that are not associated with defined dependencies in the identified dependency model;
       optimizing the non-dependent operations, wherein optimizing the non-dependent operations includes:
          configuring a promise set for at least some of the non-dependent operations, wherein the promise set enables parallel execution of the non-dependent operations, and wherein each promise enables a callback handler to be called for notification of completion of a non-dependent operation;

identifying a first non-dependent operation that is not associated with a promise of the promise set and is either a constant value or a math-based computation; and chaining the first non-dependent operation to a second non-dependent operation that is associated with a promise of the promise set, so that the first non-dependent operation is executed synchronously with the second non-dependent operation; and executing the application in the non-blocking application object framework based on the optimized execution plan.

11. The system of claim 10, wherein the first portion of the operations of the application optimized in a sequential execution order is executed synchronously during execution of the application.

12. The system of claim 10, wherein the dependency model is specifically associated with implementation logic defined for the application.

13. The system of claim 12, wherein the dependency model is specifically associated with one or more determinations performed in the implementation logic, wherein execution of at least a first determination performed in the implementation logic is dependent upon the execution output of a second determination performed in the implementation logic.

14. The system of claim 10, wherein the dependency model is created separately from the application, and wherein the dependency model defines at least one dependency associated with framework execution logic of the non-blocking application object framework.

15. A non-transitory computer-readable medium storing instructions which, when executed, cause at least one processor to perform operations comprising:

identifying a dependency model associated with an application in a non-blocking application object framework, wherein the application is associated with a plurality of operations, and wherein the dependency model defines at least one dependency between at least two of the operations of the application;

at runtime of the non-blocking application object framework, interpreting the identified dependency model;

automatically generating an optimized execution plan of the application in the non-blocking application object framework based on the interpreted dependency model, including:

identifying at least a first portion of the operations of the application as dependent operations;

optimizing the dependent operations in a sequential execution order based on dependencies defined in the dependency model;

identifying a second portion of the operations of the application as non-dependent operations that are not associated with defined dependencies in the identified dependency model;

optimizing the non-dependent operations, wherein optimizing the non-dependent operations includes:

configuring a promise set for at least some of the non-dependent operations, wherein the promise set enables parallel execution of the non-dependent operations, and wherein each promise enables a callback handler to be called for notification of completion of a non-dependent operation;

identifying a first non-dependent operation that is not associated with a promise of the promise set and is either a constant value or a math-based computation; and chaining the first non-dependent operation to a second non-dependent operation that is associated with a promise of the promise set, so that the first non-dependent operation is executed synchronously with the second non-dependent operation; and executing the application in the non-blocking application object framework based on the optimized execution plan.

16. The medium of claim 15, wherein the first portion of the operations of the application optimized in a sequential execution order is executed synchronously during execution of the application.

* * * * *